Patented June 17, 1941

2,245,631

UNITED STATES PATENT OFFICE 2,245,631

MEAT PREPARATION

Beverly E. Williams and Leon L. Cadwell, Chicago, Ill., assignors to Industrial Patents Corporation, Chicago, Ill., a corporation of Delaware No Drawing. Application June 14, 1939,
Serial No. 279,106

17 Claims. (Cl. 99—107)

This invention relates to the preparation of meat.

The invention has among its objects the preparation of novel meat cuts based upon individual muscles or groups of individual muscles as distinguished from conventional meat cuts which include bone structure, or boneless cuts prepared by merely removing bone.

The present invention is concerned broadly with a method of aging and tendering meat. An important aspect of the present invention is the preparation of boneless cuts of meat.

If the muscles of a beef carcass are separated from the bone before the animal heat has been dissipated, the meat is found to be dark in color and to be tougher, than is the case if the muscles are removed from the bone after the animal heat has been dissipated. However, if a beef carcass is permitted to chill thoroughly before the muscles are separated from the skeletal structure, the separation of the muscles into individual muscles or groups of muscles is extremely difficult. We have discovered that the phenomenon of rigor mortis plays an important part in the condition of the muscles with respect to the technique muscle separation, having in mind questions of color, toughness and ease of separation. We have discovered that the optimum results can be obtained by separating the muscles into single muscles or groups of muscles during rigor mortis, that is, not less than six hours nor more than forty-eight hours after slaughter, in the average case, the carcass being retained under appropriate beef cooler refrigeration in the interim.

It is well known that the meat from freshly boned canner and cutter cows is extremely tough and has a decidedly characteristic flavor which is not pleasant. We have discovered that cow meat may be made palatable and the meat from fine steers greatly improved by treating the meat in accordance with the present invention.

This method involves first separating the muscles individually or as groups from the skeletal structure while the beef is in the state of rigor mortis. After the muscles have been removed from the carcass, individual pieces are wrapped in a brine moistened cloth which may be prepared by soaking cloth in a 20 degree salometer reading strength brine and wringing out the excess brine. If desired, the brine may be wrung out centrifugally.

The individually wrapped cuts, which are individual muscles or groups of muscles, are then placed on screens to facilitate free circulation of air and held in beef coolers at normal beef cooler temperature and humidity for a period of time sufficient to develop tenderness and flavor. We have found that the optimum results are secured by a tenderizing and aging period in the brine moistened cloths of about eight days. Unlike other methods of aging heretofore known, the method of aging involved in the present invention does not result in dark meat nor in the production of slime or mold. Furthermore, we have found that the aging method of the present invention eliminates spoiled product which is frequently developed by ordinary methods of aging, and eliminates storing useless bone and fat in aging coolers.

In preparing a finished cut ready for the market, we prefer to wrap the meat in a fat covering. We have found that caul fat, such as fresh pork fat netting, is excellent for this purpose. When wrapped around a muscle prepared as a beef roast, pork caul fat serves to improve the appearance of the roast, protect the protein surface from contamination and place sufficient fat on the surface to assure a juicy roast without basting.

In carrying out the present invention with respect to beef, we find that it is advantageous to utilize from 50 to 75 per cent of the weight of the dressed beef carcass in the preparation of cuts in accordance with the method of the present invention. By the present method we prepare such cuts as roasting beef, pot roasting beef, boiling beef, stewing beef, and steaks, all of which are boneless, free of surplus fat, of excellent color, tender and properly aged.

In carrying out the present invention, which results in what might be termed "muscle cuts," various individual muscles or groups of muscles are grouped according to quality, flavor and tenderness, with the result that the end product or muscle cut contains muscles most suitable for the particular use for which a given cut is intended to be used such as boiling, roasting, or broiling. In preparing stewing beef appropriate muscles, after separation, may be cut into any desired size and a group of such pieces wrapped in caul fat. We prefer, in preparing stewing beef, to cut the muscles used for this purpose into relatively long strips which are formed into a roll and wrapped in caul fat. The consumer may readily prepare the conventional, relatively small individual pieces by merely slicing the roll whereby each slice will fall into as many pieces as there are strips in the roll at that point. In preparing rolls, whether from a single piece of meat or from several strips, the rolls are tied with conventional butchers' string in order to maintain the desired shape of the end product. After wrapping with caul fat sufficient string is employed to maintain the caul fat in intimate contact with the outer surface of the meat and to close the ends of the caul fat wrapping material.

It will be appreciated from the foregoing that the present invention involves, in one aspect, a new method of separating muscles during the period of rigor mortis which sets in from six to eighteen hours after slaughter and continues for two or three days, the optimum period being from eighteen hours to forty-eight hours after slaughter.

In another aspect the invention relates to a novel method of aging and tenderizing by wrapping meat in centrifugally wrung brine soaked cloths and holding in this condition until properly aged.

In practice we find that the brine soaked cloths frequently become somewhat stained with serum and blood and consequently, if the full aging period of eight days is to be employed, it is preferable to remove the first cloth employed and wrap the meat in a second clean brine soaked cloth after about four days. After wrapping in the second cloth, if the product is to be sold fresh, it may be aged for another four to six days, though the total aging period is preferably eight days. If the meat is not to be sold fresh, we find that if it is frozen after the second clean cloth has been applied on the fourth day, the product may be maintained in freezer storage indefinitely without injurious effects, the presence of the brine soaked cloth serving to prevent freezer burns during freezer storage and serving also to give the meat upon defrosting a fine, fresh, clean appearance which is frequently better than the appearance of meat which has not been frozen.

In freezing meat prepared in accordance with the present invention, any method of freezing may be employed although it is preferable to quick freeze. The preferred procedure in defrosting is to place the product which has been frozen in the brine soaked cloth in a thaw room at a temperature of about 42 degrees to 43 degrees F. with 60 to 70 per cent relative humidity for a period of about twenty hours, first brushing off any snow or frost which may have accumulated on the cloth while the product was in freezer storage. After the twenty-hour period of thaw, the product is then conditioned at a temperature of 32 degrees to 33 degrees F. for a period of about twenty-four hours in a cooler with an atmosphere of about 60 to 70 per cent relative humidity. After the product has been thawed and conditioned in this manner the cloth is removed and the product may be wrapped in caul fat in precisely the same manner as if it had not been frozen.

Although the invention has been described as practiced with beef, it is to be understood that it may be readily practiced with other types of edible meat and that the feature of aging and tenderizing may be readily practiced with cuts of beef which have not been boned. Similarly, the defrosting technique which has been described may be readily practiced with beef cuts or carcasses which have not been boned.

We claim:

1. The method of treating meat which comprises removing muscles from the skeletal structure during rigor mortis.

2. The method of treating meat which comprises removing muscles from the skeletal structure of an edible carcass between six and forty-eight hours after slaughter.

3. The method of treating meat which comprises chilling a slaughtered carcass and removing muscles from the skeletal structure of the carcass while the chilled carcass is in rigor mortis.

4. The method of treating meat which comprises removing muscles from a carcass in groups similar in edible character while the carcass is in rigor mortis.

5. The method of treating meat which comprises separating muscles from the skeletal structure of the carcass during rigor mortis, wrapping the muscles in brine moistened cloth, and aging the meat while so wrapped.

6. The method of treating meat which comprises separating muscles from the skeletal structure of the carcass during rigor mortis, wrapping the muscles in brine moistened cloth, and freezing the wrapped meat.

7. The method of treating meat which comprises separating muscles from the skeletal structure of the carcass during rigor mortis, wrapping the muscles in brine moistened cloth, aging the meat while so wrapped, and thereafter freezing the wrapped, aged meat.

8. The method of treating meat which comprises separating muscles from the skeletal structure of the carcass during rigor mortis, wrapping the muscles in brine moistened cloth, freezing the wrapped meat and thereafter thawing the meat.

9. The method of treating meat which comprises separating muscles from the skeletal structure of the carcass during rigor mortis, wrapping the muscles in brine moistened cloth, freezing the wrapped meat, thawing the meat, and conditioning at a relatively lower temperature.

10. The method of preparing muscle cuts which comprises separating muscles from the skeletal structure of an edible carcass during rigor mortis, wrapping the muscles in cloth moistened with brine of a 20 degree salometer reading, aging the brine cloth wrapped meat from four to eight days, removing the cloth.

11. The method of preparing muscle cuts which comprises separating muscles from the skeletal structure of an edible carcass during rigor mortis, wrapping the muscles in cloth moistened with brine of a 20 degree salometer reading, aging the brine cloth wrapped meat from four to eight days, removing the cloth and wrapping the muscle cuts in fat.

12. The method of preparing muscle cuts which comprises separating muscles from the skeletal structure of an edible carcass during rigor mortis, wrapping the muscles in cloth moistened with brine of a 20 degree salometer reading, aging the brine cloth wrapped meat from four to eight days, removing the cloth and wrapping the muscle cuts in caul fat.

13. The method of preparing muscle cuts which comprises separating muscles from the skeletal structure of an edible carcass during rigor mortis, wrapping the muscles in cloth moistened with brine of a 20 degree salometer reading, aging the brine cloth wrapped meat from four to eight days, removing the cloth and wrapping the muscle cuts in pork caul fat.

14. The method of preparing muscle cuts which comprises separating the muscles from the skeletal structure of an edible carcass during rigor mortis, separately wrapping each muscle in a brine moistened cloth, aging the brine moistened cloth wrapped muscle from four to eight days, and removing the cloth.

15. The method of treating meat which comprises separating the muscles from the skeletal structure of an edible carcass during rigor mortis and aging the separated muscles.

16. The method of treating meat which comprises separating the muscles from the skeletal structure of an edible carcass during rigor mortis and wrapping the separated muscles in fat.

17. The method of treating meat which comprises separating the muscles from the skeletal structure of an edible carcass during rigor mortis, aging the separated muscles and thereafter wrapping the aged muscles in fat and freezing.

BEVERLY E. WILLIAMS.
LEON L. CADWELL.